Sept. 21, 1948.   L. REICHOLD   2,449,620
FILTERING DEVICE FOR COFFEE MAKERS
Filed Sept. 22, 1944

INVENTOR.
LUDWIG REICHOLD
BY
*Louis V. Lucia*
ATTORNEY.

Patented Sept. 21, 1948

2,449,620

UNITED STATES PATENT OFFICE 2,449,620

FILTERING DEVICE FOR COFFEE MAKERS

Ludwig Reichold, Winsted, Conn., assignor to The Silex Company, Hartford, Conn., a corporation of Connecticut Application September 22, 1944, Serial No. 555,279

12 Claims. (Cl. 210—162)

This invention relates to improvements in filters and especially to such filters as are used for vacuum type coffee makers which usually comprise an upper bowl, or coffee grounds container, mounted upon a lower bowl and having a stem depending thereinto.

It is desirable that there be provided for such coffee makers, a filter assembly which will permit the use of a suitable inexpensive straining member in the form of a disposable sheet which can be readily attached to or removed from the filter assembly.

An object of this invention therefore, is to provide a filtering device which is so constructed that a strainer disk, of pervious material such as paper, cloth or the like, may be readily positioned between two separable members of said device and in such a manner that it will be securely retained in position against collapse from downward pressure thereon.

A further object of the invention is to provide means for securing the filter in position, which can be operated through the top of the upper bowl and which will permit raising of the filter assembly when subjected to excessive upward pressure caused by movement of liquid from the lower bowl into the upper bowl.

Further objects and advantages of my invention will be more clearly understood from the following description and from the accompanying drawings in which.

Figure 1:
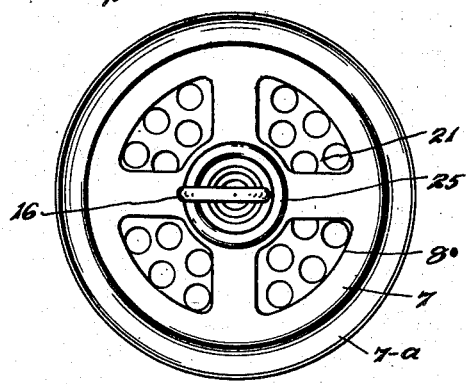
Fig. 1 is a plan view of a filtering device embodying my invention with the strainer disk removed.

As shown in the drawings, the numeral 5 denotes the upper bowl of a coffee maker having the usual stem 6. My improved filter comprises a disk-shaped plate 7 having openings 8 therethrough and secured to a sleeve 9 to which is attached one end of a coil spring. The said sleeve projects through an axial opening in the plate 7 and has a shoulder 10 which abuts the marginal edge of said plate surrounding said opening and the said sleeve and plate are preferably connected together such as by soldering as indicated at 11.

The sleeve 9 is provided with a threaded portion 12 and a reduced portion 13 depending therefrom. The said reduced portion has a contracted opening 14 in the bottom thereof to slidably receive a rod 15 having a handle 16 at its upper end and a hook 10 at its lower end.

Figure 4:
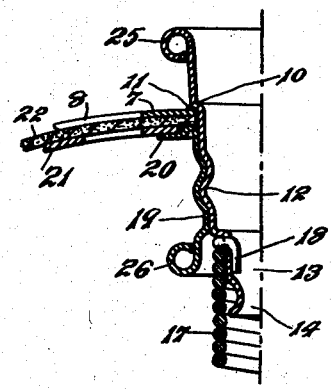
Fig. 4 is a fragmental side view, in central vertical section and on an enlarged scale, showing the construction of the filter assembly.

A coil spring 17 is secured to the reduced portion 14 by means of an extension 18 on said spring which projects through an opening in the side of said portion, as clearly illustrated in Fig. 4, and which is bent downwardly to form a hook for securing said spring to the inner sleeve 9.

An outer sleeve 19 is threaded over the inner sleeve 9, from the bottom thereof, and has a flange 20 to which is secured, preferably by solder, a strainer supporting disk-shaped plate 21 which may be perforated or formed with openings such as in the disk 7.

A filtering disk 22, of pervious material such as cloth, paper or other suitable material, is provided and the said disk has a central opening to receive the sleeve 9 therethrough.

The bottom end of said spring 17 is secured to the rod 15, preferably by means of a loop 23 on said spring which engages projections 24 on the rod.

The sleeves 9 and 19 are each provided with flanges, respectively 25 and 26, to permit convenient grasping of said sleeves for rotation.

Figure 3:
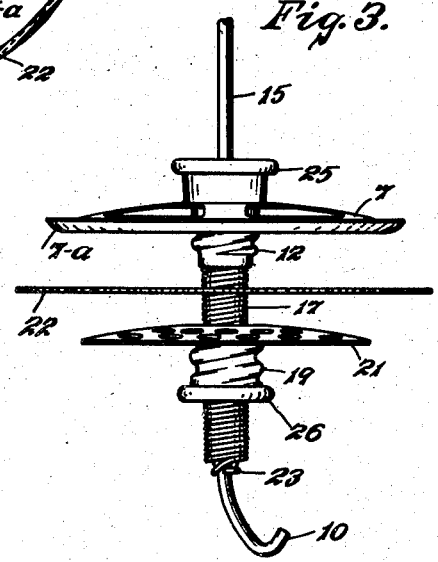
Fig. 3 is an elevational side view of my improved filter showing the upper and lower frames thereof separated and a portion of the handle broken off.

When it is desired to insert a new straining member 22 in my improved filtering device, the said member is first passed over the lower portions of the rod 15, the spring 17 and onto the sleeve depending portion of the sleeve 9. It is then followed by the plate 21 with the sleeve 19 thereon, as clearly illustrated in Fig. 3. The said plates are then brought together and the sleeve 19 is threaded over the sleeve 9 so that the disk 22 is securely clamped flat between the plates 7 and 21 as clearly illustrated in Fig. 4.

Figure 2:
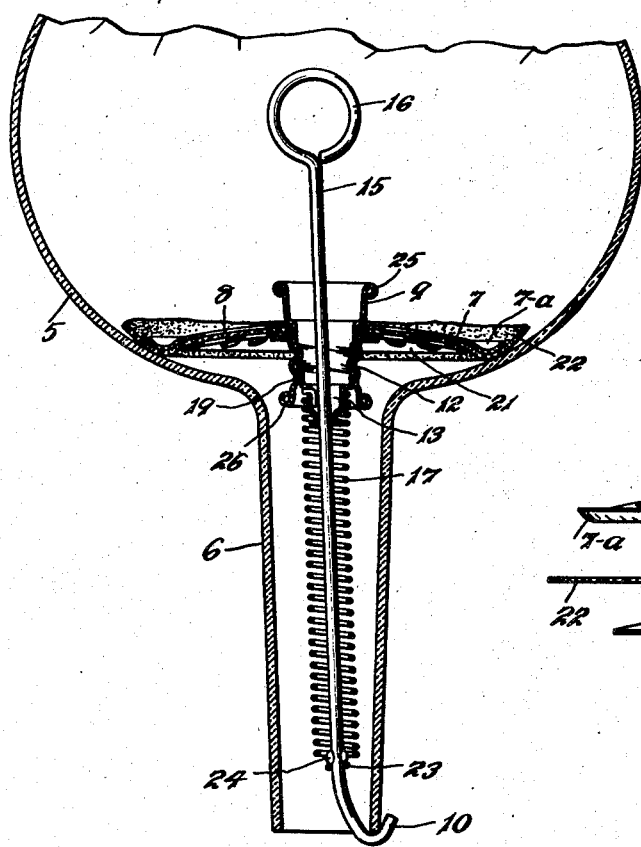
Fig. 2 is a side view, in central vertical section, illustrating my improved filtering device as applied to the upper bowl of a vacuum type coffee maker.

The filtering device may then be placed against the bottom of the upper bowl of a coffee maker, as illustrated in Fig. 2, and secured therein by grasping the handle portion 16 and forcing the rod 15 downwardly through the contracted opening 14 until the spring 17 has been stretched sufficiently to permit the hook 10 to engage the bottom edge of the stem 6. The rod 15 is then tipped slightly toward one side, causing the hook 10 to underlie the edge of the stem, whereupon, the rod 15 is released and the spring will be secured to the stem. The said spring will then exert a downward pull on the sleeve 9 which will urge the filter assembly downwardly and clamp the margin of the filter disk 22 between the bottom surface of the upper bowl 5 and the marginal edge portion 7—a of the plate 7. It will be noted that the said edge portion overlies the edge of the plate 21 and extends downwardly so that the straining member is brought into direct contact with the bottom of the upper bowl on a plane below the bottom of the lower plate 21.

It will also be noted that the walls of the contracted opening 14 are vertically curved to permit tilting motion of the bar 15, so that the hook 10 may be brought into register with the bottom edge of the stem 6, and still allow the said bar to fit sufficiently close within the said opening to prevent the passage of coffee grounds between the side of the opening and the bar 15.

It will be understood that the sleeves 9 and 19 may be assembled or disassembled by simply grasping the flanges 25 and 26 with the fingers of each hand and turning them when it is desired to replace the strainer disk 22.

My improved assembly also permits the use of an inexpensive straining member which does not require special construction other than having a suitable opening through the center thereof and thus provides an economical as well as a highly efficient filtering device.

I claim:

1. A filtering device of the character described comprising an upper perforated plate, a lower perforated plate, cooperating means on said upper and lower plates for securing them together to clamp a sheet of strainer material therebetween, and a spring member attached to said upper plate and extending through an opening in said lower plate for securing said filtering device against the bottom of a container; the said lower plate being slidable over said spring member to permit separation therefrom from the upper plate for replacement of said strainer sheet.

2. A filtering device of the character described comprising an upper perforated plate, a lower perforated plate, a threaded sleeve secured to said upper plate and extending downwardly through said lower plate, a threaded sleeve on said lower plate; the sleeve on said upper plate having a reduced opening extending therethrough, a rod extending through said opening, the said opening fitting closely around said rod while permitting swivel movement thereof, and a spring member having one end thereof secured to said rod and the other end secured to the sleeve of the upper plate for retaining said device in operative position.

3. A filtering device of the character described comprising an upper frame including an upper perforated plate having a sleeve secured thereto; the said sleeve projecting from a point above the said upper plate to a point below the same, a lower frame including a lower perforated plate, a sleeve secured to said lower perforated plate and depending downwardly therefrom; the said sleeves being threaded for interengagement and provided with annular handle portions for manual separation thereof; the said sleeve of the upper frame having a reduced opening extending therethrough, a rod slidable in said opening, a hook at the bottom of said rod, and a spring attached to the said sleeve of the upper plate and to the said rod between said hook and filtering device for securing said device in position against the bottom of a container.

4. A filtering device as set forth in claim 3 wherein the sleeve secured to the lower plate is detachable from the filter over said spring member and hook.

5. For a coffee maker of the character described, a filtering device comprising upper and lower perforated frames in threaded engagement and adapted to clamp a sheet of straining material therebetween, the said upper frame having an opening therein, a rod closely fitting within said opening and swivelly and slidably movable therein, a spring secured to said upper frame and to the rod, at a point adjacent the bottom of said rod, and a hook at the end of said rod for engaging a portion of the coffee maker to secure said filtering device in position against a bottom in the coffee maker.

6. A filtering device of the character described comprising an upper perforated plate, a lower perforated plate, interthreaded means for securing said upper and said lower plates together to clamp a sheet of straining material therebetween, the said means including a sleeve secured to the upper plate and projecting downwardly therefrom through a sleeve secured to the lower plate; the bottom portion of said sleeve of the upper plate being reduced in external diameter and having at the bottom thereof a reduced opening of relatively short length, a rod slidably and swivelly fitting within said opening, a coiled spring member having an end fitting over said reduced bottom portion and secured thereto and an opposite end secured to said rod; a hook at the end of said rod, and a handle portion at the upper end of said rod; the said lower plate and sleeve thereby being removable over said spring and hook.

7. A filtering device as set forth in claim 6 wherein the said reduced portion is provided with an aperture in the side thereof and the end of said spring is secured to said portion by extending through said opening.

8. A filtering device of the character described comprising an assembly including upper and lower perforated plates detachably connected for interchangeably securing a sheet of pervious material therebetween, a spring member secured to said assembly and having a hook portion at the lower end thereof, and a rod slidable through said assembly for manipulating said hook portion to engage with an abutting member for securing said filtering device against the bottom of a container.

9. In a filtering device of the character described comprising an upper perforated plate, a lower perforated plate, means for detachably interlocking said plates and clamping a sheet of pervious material therebetween, an upper plate having a marginal portion extending beyond the peripheral edge of the lower plate and downwardly over said edge for positioning said strainer sheet in engagement with the surface of a container on a plane below the bottom of said lower plate, and means for securing said filtering device in said container.

10. A filtering device of the character described comprising an upper plate, a lower plate; both of said plates having filtering openings extending therethrough, a sheet of pervious material clamped between said upper and lower plates, the said upper plate having a marginal portion extending downwardly over the peripheral edge of the lower plate for retaining the bottom of said strainer sheet in contact with the surface of a container, and means urging said filtering device against said surface.

11. A filter for coffee makers comprising an upper perforated plate, a sleeve of relatively thin sheet material extending downwardly through said plate and having a handle portion projecting upwardly from the plate, a lower perforated plate, a sleeve secured to said lower plate and extending downwardly therefrom; the said sleeves being threaded for interengagement to clamp a sheet of pervious material between said plates; a lower portion of the said sleeve on the upper plate being reduced in external diameter and having a reduced axial opening of relatively short length, a rod slidably and swivelly extending through said opening, and a spring secured to said reduced portion and to said rod for clamping said filtering device against the bottom of a container.

12. In a filtering device of the character described, a plate assembly including a pair of perforated clamping plates for clamping a sheet of pervious material therebetween, means for detachably engaging said plates, a rod slidable through said plates and having a hook at the lower end thereof, a coiled spring surrounding said rod and secured at one end to the plate assembly and at the lower end to said rod; the said lower end of the spring including a coil of a reduced diameter, and projections on said rod engageable by said coil for securing the lower end of the spring to the rod.

LUDWIG REICHOLD.

REFERENCES CITED

The following references are of record in the file of this patent:

UNITED STATES PATENTS

| Number | Name | Date |
| --- | --- | --- |
| 2,171,321 | Miller | Aug. 29, 1939 |
| 2,234,678 | Matson | Mar. 11, 1941 |
| 2,300,606 | Wolcott | Nov. 3, 1942 |
| 2,312,556 | Jepson | Mar. 2, 1943 |
| 2,345,262 | Jepson et al. | Mar. 28, 1944 |
| 2,345,265 | Jepson et al. | Mar. 28, 1944 |
| 2,370,674 | Lucia | Mar. 6, 1945 |
| 2,388,335 | McCullough | Nov. 6, 1945 |

FOREIGN PATENTS

| Number | Country | Date |
| --- | --- | --- |
| 401,322 | Great Britain | Nov. 7, 1933 |